Patented May 30, 1933

1,911,463

UNITED STATES PATENT OFFICE

ANNIE R. C. OWEN, OF WASHINGTON, DISTRICT OF COLUMBIA

FOOD MATERIAL AND PROCESS OF MAKING SAME

No Drawing.  Application filed March 3, 1932. Serial No. 596,673.

The present invention relates to a novel food compound, and to a method of preparing the same, and has for its object to produce a food compound which shall be in itself substantially a complete food, which shall be capable of being shipped or carried to any climate, capable of being kept for a long period without injury, and which shall be a highly concentrated food so that it can readily be carried as such to places where fresh food is not usually available.

The material known as "Brunswick stew" is already well known. This material has heretofore been commonly made by cooking together, meat of any kind, and vegetables, the latter varying in character and amount, depending upon the taste of the individual. In the present invention I employ a somewhat similar material, produced from one part of lean meat, such as lean beef, chicken, lamb, salmon or other fish, flesh or fowl, or other equivalent fleshy material, combined with one part of potato, one part of green corn, one part of tomatoes (pulp and juice), and preferably also with one part of lima beans, although other beans or peas can be used as a substitute for the latter. Salt, pepper or other condiments can be added to suit the individual taste.

The meat is preferably first broiled, and then may be chopped up, e. g., by running through an ordinary food chopper or grinder. The vegetables except the tomatoes are also preferably first cooked (e. g. boiled). The tomatoes can conveniently be first scalded so as to readily remove the skins, but do not require any previous cooking. The green corn, tomatoes and lima beans are preferably run together through a food chopper or grinder, and the potatoes are mashed. Or these can be thoroughly mixed and blended in other ways.

In making up my new food compound, I preferably also add, in addition to the five parts above referred to, about one part of previously cooked barley or other grain with the outer husk preferably removed. The grain may be previously soaked in water in excess, for several hours or over night. In this way, the grain may take up about 2.5 to 3.5 times its own weight of water. Thus a pound of soaked barley may contain 4–5 ounces of dry barley which has soaked up 11–12 ounces of water. This addition considerably improves the flavor of the material, and also adds substantially to its food value, by increasing the starchy contents, and serves as an additional binding agent. "Pearl barley" is very suitable.

The grain can be used whole or cracked or ground to a flour or meal. It may previously be malted or toasted or roasted if desired. Bread crumbs, cracker crumbs, (fresh, stale or toasted) can also be used in place of the whole or dehusked grain. Cereal breakfast foods now on the market can also be used. These products taken collectively are embraced under the term "grain" as used hereinafter. This material, especially the whole or dehusked grain, can (preferably after soaking) be run through the food chopper with the other components, if desired.

It will be understood that the grinding of the solid ingredients of the food may be performed before, during or after the cooking operation.

In some cases I can use an equivalent amount of eggs and cream or milk, in place of the meat. Thus instead of a pound of meat, I could use about four eggs and about two ounces of cream or four ounces of milk.

The above materials, together with a small amount of water if desired, are made up into a stew and are cooked, for example in a fireless cooker, until a rather stiffened consistency has been produced (preferably as short a time as possible). In some cases it is not necessary to add any water other than the juice contained in the tomatoes and other vegetables above referred to, and if water is added I preferably do not add but a small quantity, in order to prevent the necessity of using excessive quantities of heat in the subsequent drying operations. In the modification using eggs and milk or cream, these are preferably added just before the end of this cooking operation. The material then having been cooked as above described, is dried in any suitable manner. This drying may be conducted in trays, perforated or not, either at atmospheric pressure, or at a reduced pressure, and the drying is preferably conducted by the aid of heat. During the drying, the material can be stirred, either continuously or intermittently, if desired. When stirring is used the dried product will be of a coarse granular or flaky or lumpy consistency. In drying without stirring, the product may be converted into the form of a flat cake or cracker. Or it can be made into cakes or other shapes, before or during the drying operation.

The dried product can then be comminuted if desired (but preferably is not further comminuted), and can be put up into packages such as paper cartons, and can be kept in this condition for any desired length of time.

For using the food contents above referred to for making a stew, it is necessary only to add a small amount of hot or cold water, and then the material can be cooked together if desired, or in many cases no further cooking will be necessary, sufficient cooking having been already accomplished in the previous operation. The dried material can be eaten as such, i. e., without any further treatment of the dried product, or can be made into numerous dishes such as omelets, croquettes, salads, or on toast, pattees, etc.

In this way there is prepared a highly concentrated stable food material, producing a rich flavor and having the useful properties above referred to. This product, so prepared, is suitable either as an emergency ration, or as a regular diet, or pick-up lunch, or as a quick meal. The product, as will be noted, contains "roughage", namely the insoluble parts of the materials used. This roughage is important in furnishing material to be chewed and to exercise its usual functions in the intestinal tract.

For making up this product for use particularly in cold climates it is in some cases advisable to add to the above components, peanut meal, that is to say peanut meats from which most of the oil has been removed. One to two ounces of peanut meal being added to five pounds of the other constituents; this being added, for example during the cooking step. Salt, pepper and other seasoning can be added if desired.

In some cases it is also advisable to add a material capable of causing the cooked material or the final stew, to jellify; animals' heads or feet or the like can be added at the beginning for this purpose, or gelatin or equivalent can be added, say, just before the drying step, or during this step, or could be added after the drying step. This addition is optional.

In the first specific example above given, as well as in numerous other examples that might be given, the product of this process (by virtue of the proportions) constitutes a balanced ration, which will obviously be of great importance in putting out a highly concentrated food product, of the nature set forth.

I preferably do not add any extraneous fatty materials, such as suet, fat bacon, ham fat, or the like, which if present in considerable amounts would tend to rancidify and would render the product greasy and unappetizing.

It will be understood that throughout the specification "parts" refers, as is usual, to parts by weight.

The product can be put up into any suitable sized containers, of any suitable material, cardboard, paper, tin plate, aluminum, "Cellophane", tin foil, etc.

The present case is in part a continuation of my prior application Serial No. 457,534, filed May 29, 1930, which in turn is in part a continuation of an earlier application Serial No. 37,867, filed June 17, 1925.

I claim:

1. A process which comprises cooking together lean meat and several vegetable materials free from substantial amounts of extraneous fatty materials, the combined amount of such vegetable materials being several times more than the amount of such meat, continuing the cooking until a stiffened consistency is secured, and thereafter drying substantially the entire product, whereby there is obtained a dry material capable of giving an edible stew, when subsequently cooked up with water.

2. A food product comprising lean meat, potato, corn, legumes, tomatoes and grain free from substantial amounts of extraneous fatty material, such materials being cooked together and dried, the total amount of the vegetables being several times greater than the total amount of meat, the flavors of said materials being blended together as a result of cooking together, the product being of a coarse lumpy consistency rather than a fine uniform powder, such product when being subsequently cooked up with water forming a meat—and—vegetable stew containing insoluble matter and such dry product containing both the soluble and the insoluble portions of the meat and vegetables.

3. As a novel food material, a cooked, dried mixture of lean meat, potato, corn, tomato, legume and grain, the first five being in approximately equal quantities, and substantially free from extraneous fatty materials, the said materials being thoroughly blended together.

4. As a novel food material, a cooked, dried mixture of lean meat, potato, corn, tomato and legume, the corn and legume carrying their normal content of insoluble matter, to provide roughage, all in approximately equal quantities, together with grain and substantially free from extraneous fatty materials, the said materials being thoroughly blended together and in a condition substantially coarser than a powder, requiring mastication.

5. As a new food material, a cooked dried mixture of eggs and milky material, potato, corn, tomato, legume and grain, the potato, corn, tomato and legume being in approximately equal amounts and the others being in smaller amount, and substantially free from other fatty materials, said materials being thoroughly blended together and dried.

6. As a new food material, a cooked dried mixture of proteinaceous edible material of animal origin, potato, corn, tomato, legume and grain, the potato, corn, tomato and legume being in approximately equal amounts and the others being in smaller amount, and substantially free from other fatty materials, said materials being thoroughly blended together and dried.

In testimony whereof I affix my signature.

ANNIE R. C. OWEN.